N. J. CLARKE.
Thill Coupling.
No. 112,783. Patented March 21, 1871.
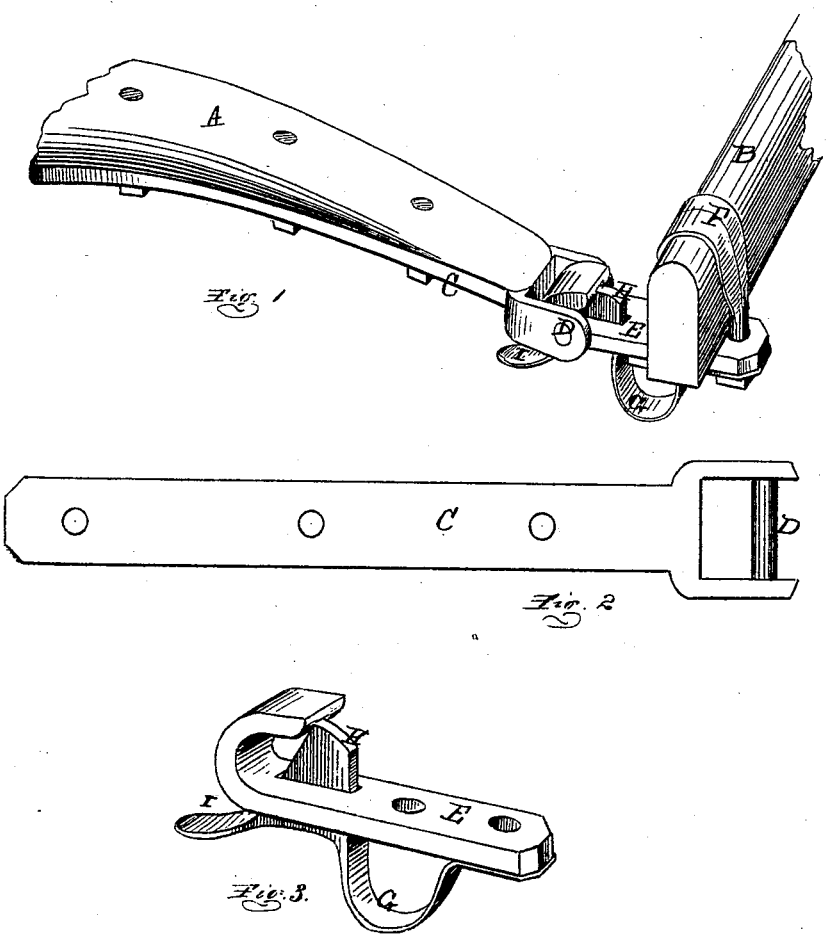
ATTEST
M. Stewart
Frederick Oberts
INVENTOR
Newton J. Clarke
per Atty
Thos. S. Sprague
N. PETERS, PHOTO-LITHOGRAPHER, WASHINGTON, D. C.

United States Patent Office.

NEWTON J. CLARK, OF CLARKSTON, MICHIGAN, ASSIGNOR TO HIMSELF AND MILTON H. CLARK, OF SAME PLACE.

Letters Patent No. 112,783, dated March 21, 1871.

IMPROVEMENT IN THILL-COUPLINGS.

The Schedule referred to in these Letters Patent and making part of the same.

*To whom it may concern:*

Be it known that I, NEWTON J. CLARK, of Clarkston, in the county of Oakland and State of Michigan, have invented a new and useful Improvement in Shaft and Thill-Couplings; and I do declare that the following is a true and accurate description thereof, reference being had to the accompanying drawing and to the letters of reference marked thereon and being a part of this specification, in which—

Figure 1 shows a shaft and axle coupled together with my improved coupling.

Figure 2 is that part of my coupling which is attached to the end of the shaft or thill.

Figure 3 is that part of my coupling which is attached to the axle, and which engages with the part which is attached to the end of the shaft.

Like letters indicate like parts in each figure.

The nature of this invention relates to an improved construction of a device for attaching poles and thills to wagons and carriages; and consists in the peculiar and new arrangement of the various parts, as more fully hereinafter explained.

In the accompanying drawing—

A represents a shaft or pole, or one of a pair of thills; and

B, the axle of a wagon or carriage, to which the shaft, pole, or thill is attached.

C is a strap, the end of which is bifurcated, as shown, the two ends of said bifurcation being secured together by a bolt or rivet, D.

E is a hook secured to the axle by the clip F, and is designed to engage with the bolt or rivet D.

G is a spring secured to the axle or hook by means of one of the bolts of the clip, and to this spring is attached the latch or stud H, which passes through a slot in the hook E, and its office is to securely hold the bolt or rivet D in its engagement with the hook E. The front side of this latch or stud should be inclined so that as the rivet, by use, wears in the hook, the inclined face of the latch will be compelled by the spring to act as a wedge and still retain the bolt or rivet in its close engagement with the hook.

The spring is provided with a thumb-piece, I, by means of which, when it is desired to disengage the bolt or rivet from the hook, it can readily be done.

The operation of this device is so simple that a further explanation thereof is deemed unnecessary in this specification.

What I claim as my invention, and desire to secure by Letters Patent, is—

The spring G, provided with latch or stud H, in connection with the strap C, bolt or rivet D, and hook E, when each part is constructed substantially as described, and arranged to operate as set forth.

NEWTON J. CLARK.

Witnesses:
M. STEWART,
FREDERICK EBERTS.